May 7, 1963  A. MARCUS  3,088,729
QUICK-ACTING VISES
Filed Nov. 8, 1960  2 Sheets-Sheet 1
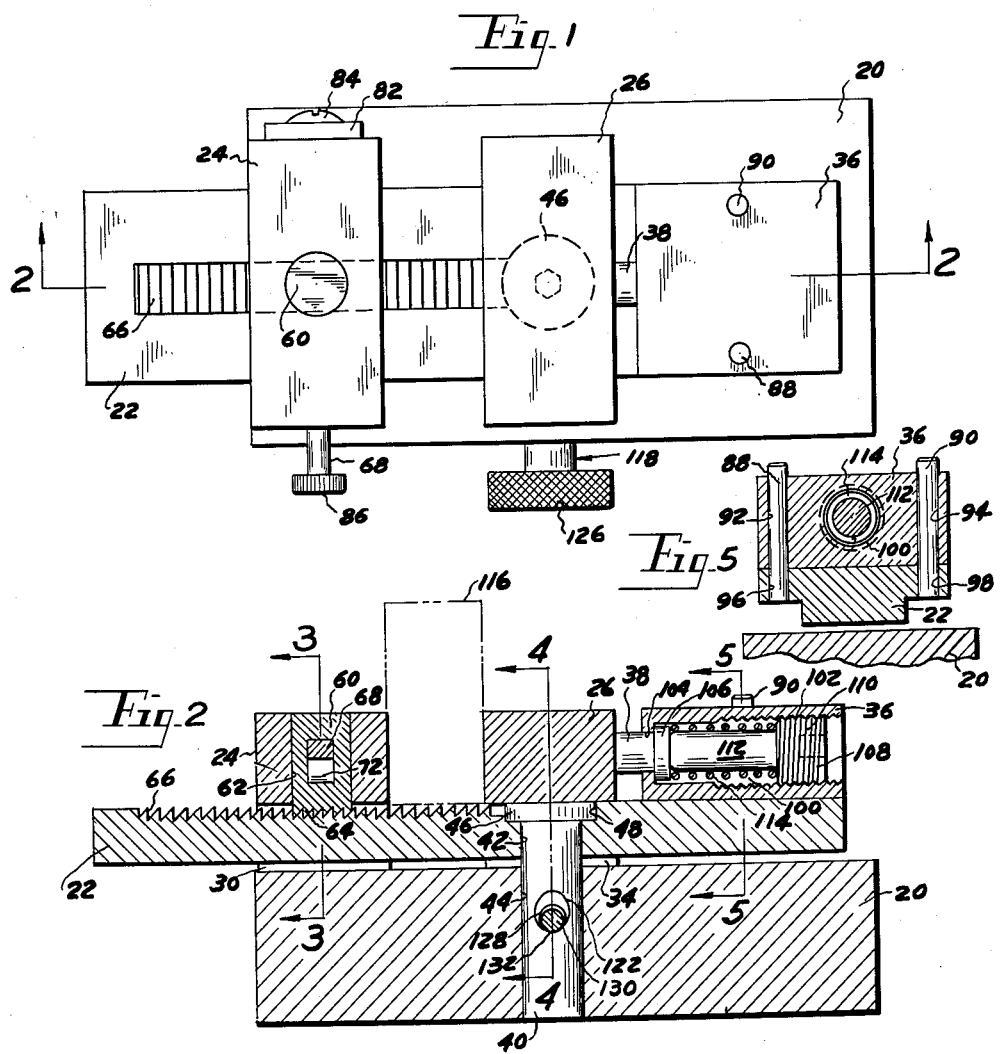
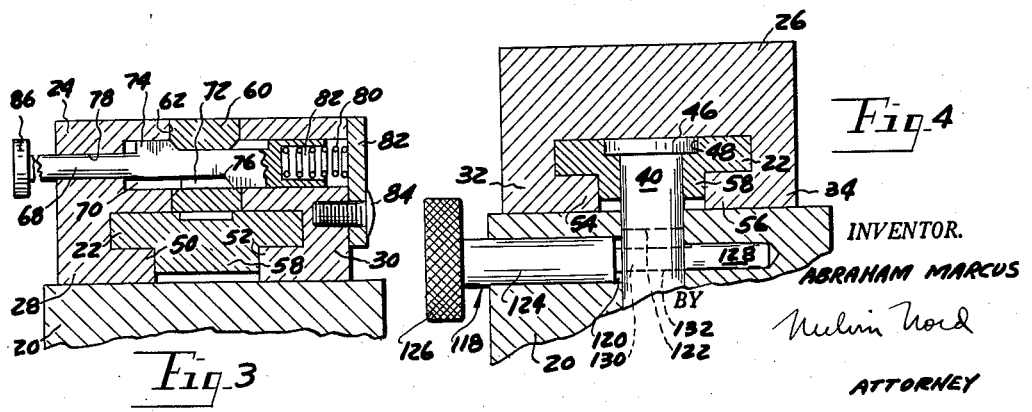
INVENTOR.
ABRAHAM MARCUS
BY
ATTORNEY May 7, 1963  A. MARCUS  3,088,729
QUICK-ACTING VISES
Filed Nov. 8, 1960  2 Sheets-Sheet 2
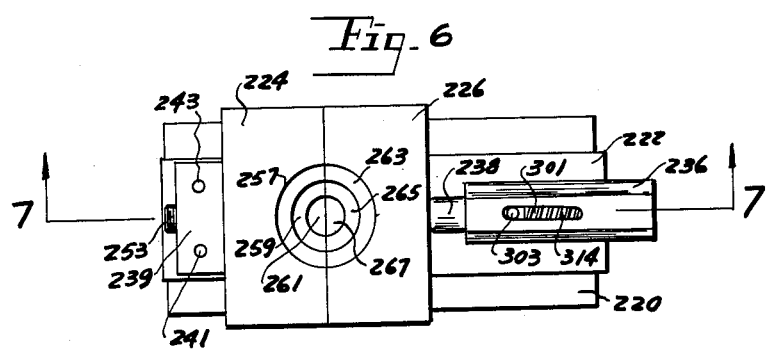
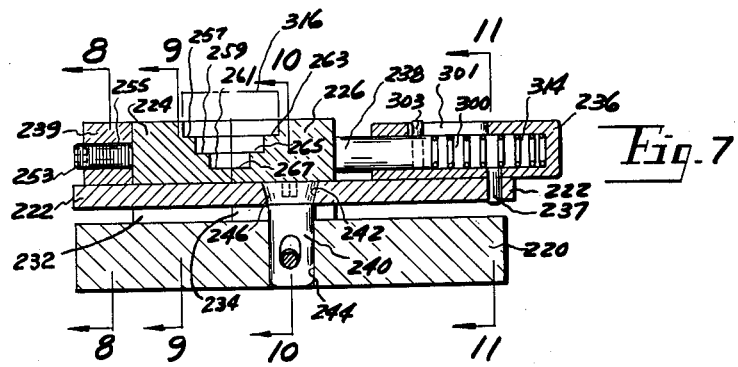
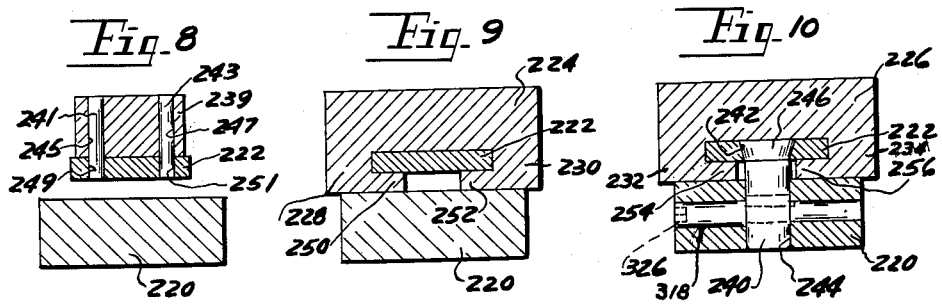
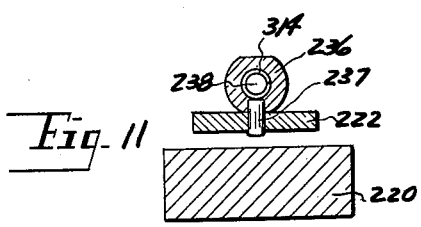
INVENTOR.
ABRAHAM MARCUS
BY
ATTORNEY United States Patent Office 3,088,729
Patented May 7, 1963

3,088,729
QUICK-ACTING VISES
Abraham Marcus, 95 W. Dakota, Detroit, Mich.
Filed Nov. 8, 1960, Ser. No. 68,009
5 Claims. (Cl. 269—97)

This invention relates to improvements in vises. More particularly, it relates to quick-acting vises which are capable of very rapid opening or closing and clamping.

An object of this invention is to provide a vise having jaws each slidably accommodated on a track support and adapted for rapid sliding motion therealong to work-clamping position, and means for clamping said jaws in said position by the rapid operation of a single actuating means.

Another object of this invention is to provide a vise having a table, a track support mounted parallel to and spaced above said table, jaws each slidably accommodated on said track support and adapted for rapid sliding motion therealong to work-clamping position and provided with depending members which are slidably supported on said table, and actuating means for clamping said jaws in work-clamping position by the activation of a rapid-acting cam member which pulls said track downwardly toward said table thereby tightening said depending members of said jaws against said table.

A further object of this invention is to provide a vise having jaws each slidably accommodated on a track support and adapted for rapid sliding motion therealong to work-clamping position, a block fixedly mounted on said track support and provided with a spring-loaded pin extending longitudinally therefrom and adapted for bearing against one of said jaws when the latter is slid to its extreme position, and means for clamping the other jaw in work-clamping position by the rapid operation of a single actuating means.

Still another object of this invention is to provide a vise having jaws, one of which is fixed in position or bears against a fixed block, the other jaw being slidably accommodated on a track support, and a second fixed block mounted on said track support and provided with a spring-loaded pin extending longitudinally therefrom and bearing against said slidable jaw, said slidable jaw being adapted to be moved against said spring-loaded pin to compress said spring thereby allowing the insertion of a workpiece between said jaws and subsequently to be released to bear against said workpiece by virtue of the force of spring-loaded pin.

An advantage of this invention is the extreme rapidity of opening or closing and clamping the vise. Another advantage of the invention is that the vise jaws and track support may be rotated in position as a unit with respect to said table and clamped in desired position at the same time and with the same motion as is used to clamp said jaws in work-clamping position. A further advantage is the ruggedness and low cost of the vise, and its ready adaptability for use in relatively large sizes or in small sizes suitable for use for example by jewellers.

Other objects and advantages will more fully appear from the following description and drawings, wherein are disclosed preferred embodiments of the invention.

In the drawings:

FIG. 1 represents a top plan view of a first embodiment of the invention;

FIG. 2 represents a cross-sectional view taken along the lines 2—2 of FIG. 1;

FIG. 3 represents a fragmentary cross-sectional view taken along the lines 3—3 of FIG. 2;

FIG. 4 represents a fragmentary cross-sectional view taken along the lines 4—4 of FIG. 2;

FIG. 5 represents a fragmentary cross-sectional view taken along the lines 5—5 of FIG. 2;

FIG. 6 represents a top plan view of a second embodiment of the invention;

FIG. 7 represents a cross-sectional view taken along the lines 7—7 of FIG. 6;

FIG. 8 represents a cross-sectional view taken along the lines 8—8 of FIG. 7;

FIG. 9 represents a cross-sectional view taken along the lines 9—9 of FIG. 7;

FIG. 10 represents a cross-sectional view taken along the lines 10—10 of FIG. 7; and FIG. 11 represents a cross-sectional view taken along the lines 11—11 of FIG. 7.

In the drawings, similar numerals represent similar parts.

Referring now in more detail to FIGS. 1–5, there is shown a preferred embodiment of the invention. The vise comprises generally a table 20, a track support 22 mounted substantially parallel to and spaced above said table 20, a pair of jaws 24 and 26 each slidably accommodated on said track support 22 and adapted for rapid sliding motion therealong to work-clamping position, members 28 and 30 depending from jaw 24 at each side of track support 22 and resting on table 20, similar members 32 and 34 depending from jaw 26 at each side of track support 22 and resting on table 20, a block 36 fixedly mounted on track support 22 and provided with a spring-loaded bumper pin 38 extending longitudinally therefrom and adapted for bearing against jaw 26, and a vertical shaft 40 extending through corresponding mating cylindrical bores 42 and 44, respectively, in track support 22 and table 20, and provided with a flanged head 46 adapted to rest in a corresponding countersunk recess 48 in track support 22.

The aforesaid depending members 28 and 30 of jaw 24 are provided with gripping flange members 50 and 52 extending below said track support 22 to facilitate sliding of jaw 24 along track support 22 and to space said track support 22 above table 20. Similarly, depending members 32 and 34 of jaw 26 may be provided with gripping flange members 54 and 56, serving similar purposes. If desired, track support 22 may be provided along its lower surface with a spacing strip 58 of smaller width than said track support 22, that is, of width slightly less than the distance between the inner edges of gripping flanges 50, 52, and of gripping flanges 54, 56, and of height less than the height of said gripping flanges 50, 52, 54, and 56, in the manner shown in FIGS. 3 and 4. If desired, said spacing strip 58 may be integral with said track support 22, as shown in the drawings. Thus, jaws 24 and 26 are positively guided for ready sliding back and forth along track support 22. It will be noted, from FIGS. 2–5, that in any event, jaws 24 and 26 rest slidingly on table 20, while track support 22 and spacing strip 58 are spaced above table 20.

Jaw 26 has now been fully described; its function is simply to be slid along track support 22 to the desired position for work-clamping, and then to be clamped into position in a manner described below.

Jaw 24, on the other hand, is preferably also provided with a cylindrical locking pawl plunger 60 slidably housed in a corresponding vertical bore 62 extending through jaw 24, as shown. Said locking pawl plunger 60 is provided at its lower end with a plurality of downwardly extending pawl teeth 64 adapted to mate with corresponding pawl tooth recesses 66 in the upper surface of track support 22. As is evident from the drawings, when teeth 64 and 66 are engaged, jaw 24 is fixed in position on track support 22. On the other hand, when locking pawl plunger 60 is lifted (by means described below) so that said teeth 64 and 66 are disengaged, jaw 24 is free to be slid back and forth along track support 22 as desired.

The aforesaid means for lifting locking pawl plunger 60 comprise a sliding bolt or cam member 68 slidingly housed in a passage 70 extending horizontally through jaw 24 and through a corresponding horizontal passage 72 extending through locking pawl plunger 60. Sliding cam member 68 is provided (as shown in FIG. 3) with an upwardly projecting cam portion 74 and a downwardly depending cam portion 76. The aforesaid horizontal passage 70 extending through jaw 24 is of suitable size and shape, in the region of said locking pawl plunger 60, to slidingly accommodate both of said cam portions 74 and 76, and is preferably reduced in size at one end, as shown at 78 to provide a limit for outward motion of said sliding cam member 68. On the other hand, the height of the aforesaid horizontal passage 72 extending through locking pawl plunger 60 is great enough to accommodate one or the other of said cam portions 74 or 76, but not both, as shown in FIG. 3. Thus, when sliding cam member 68 is in an outward position, such as shown in FIG. 3, locking pawl plunger 60 is pulled downwardly thereby, causing engagement of pawl teeth 64 with the pawl tooth recesses 66 of track support 22. Conversely, when sliding cam member 68 is pushed inwardly, locking pawl plunger 60 is pushed upwardly thereby, causing disengagement of said teeth 64 and 66. A coil spring 80 is preferably provided at one end of horizontal passage 70 in jaw 24, which acts to urge sliding cam member 68 normally outwardly. Spring 80 is preferably housed in a cylindrical recess 82 provided at the corresponding end of sliding cam member 68, and is maintained under compression by an end plate 82 which is fastened by screw 84 to jaw 24, so as to cover said end of horizontal passage 70 in jaw 24. A knob 86 is preferably provided at the outward exposed end of sliding cam member 68, as shown.

Thus, when knob 86 is pushed inwardly, teeth 64 and 66 become disengaged, allowing sliding of jaw 24 along track support 22. When knob 86 is released, teeth 64 and 66 become engaged, and jaw 24 remains locked in position on track support 22.

Referring now to FIGS. 1, 2, and 5, there is shown the aforesaid block 36 fixedly mounted on track support 22 by means of vertical locking pins 88 and 90 which extend through corresponding vertical bores 92 and 94 through block 36, and through corresponding vertical bores 96 and 98 through track support 22. Block 36 is provided with a horizontal passage 100 extending longitudinally through block 36. Said passage 100 is provided with female threads 102 at its outer end, and is reduced in diameter at the other end, as shown at 104, to slidingly accommodate spring-loaded bumper pin 38. Said bumper pin 38 is provided with a flanged head 106, which is of larger diameter than the aforesaid end 104 of said horizontal passage 100. Thus, said end 104 of reduced diameter, serves to limit motion of said pin 38 in passage 100. A set screw 108, provided with male threads 110 adapted to mate with the aforesaid female threads 102, is screwed into said horizontal passage. Set screw 108 is provided, at its inner end, with a longitudinal rod portion 112 which bears against flanged head 106 of bumper pin 38. A coil spring 114 is mounted over said rod portion 112, as shown in FIG. 2, and is maintained under compression by the end of flanged head 106 of bumper pin 38 and the end of the enlarged, threaded portion of set screw 108. Thus, bumper pin 38 is normally urged outwardly under the compressive force of spring 114, being thereby adapted to exert an elastic bearing force against jaw 26. However, if set screw 108 is screwed in as far as it will go, this causes rod portion 112 thereof to force bumper pin 38 to its limiting position; in this case, bumper pin 38 is adapted to exert an unyielding bearing force against jaw 26. This position, which is shown in FIG. 2, is preferred when it is necessary to exert an unusually strong clamping action on a workpiece 116 (shown in phantom in FIG. 2). In such case, the method of clamping the vise is as follows: (1) with set screw 108 screwed in nearly all the way, jaw 26 is slid against spring-loaded bumper pin 38; (2) workpiece 116 is then placed on track support 22, bearing against jaw 26; (3) knob 86 is pushed inwardly, disengaging teeth 64 and 66, and jaw 24 is slid against workpiece 116; (4) knob 86 is then released, allowing the engagement of teeth 64 and 66, bumper pin 38 moving inwardly or outwardly to the slight extent necessary to allow this engagement. In some cases, the workpiece 116 is now held sufficiently tightly to permit the performance of the desired work upon it with no further clamping operation; this is particularly so, if the workpiece is relatively small, and spring 114 is sufficiently strong. If it is desired to tighten the vise still further, this may be done simply by tightening set screw 108 the slight amount necessary to cause rod 112 to bear against the flanged head 106 on bumper pin 38, whereupon the vise jaws 24 and 26 and workpiece 116 are clamped together rigidly by the force of engagement of teeth 64 and 66, and the force exerted by set screw 108. In order to accomplish this additional tightening rapidly, a set screw wrench (not shown) may be permanently mounted on set screw 108; alternatively, if desired, set screw 108 may be provided with a thumb screw (not shown). An alternative or additional means of tightening jaws 24 and 26 in position is also described below, in connection with the discussion of FIG. 4.

As shown in FIGS. 1, 2, and 4, vertical shaft 40 is provided with flanged head 46 resting in a countersunk recess 48 in track support 22, for the purpose of permitting rotation of track support 22 around said shaft 40, and for tightening jaws 24 and 26 into clamping position. The means by which this clamping action is accomplished will now be described. In general, this is accomplished by the acton of a manually rotatable eccentric cam member indicated generally as 118, which is inserted in a horizontal recess 120 in table 20, and a portion of which passes through a horizontal passage 122 extending through vertical shaft 40. Said rotatable cam member 118 comprises a longitudinal outer shaft portion 124 provided with a knob 126 at its outermost end, a concentric longitudinal shaft portion 128 at the other or inner end, and an eccentric member 130 joining said shaft portions 124 and 128. Eccentric member 130 preferably comprises, as shown, a narrowed axially non-aligned section, and is housed in the aforesaid horizontal passage 122 in vertical shaft 40. Horizontal passage 122 in vertical shaft 40 is not in vertical alignment with the horizontal recess 120 in table 20, but rather is vertically offset thereabove, as seen in FIGS. 2 and 4, by virtue of the fact that jaws 24 and 26 act as spacers, maintaining track support 22 elevated with respect to table 20. This, in turn, tends to raise vertical shaft 40, because the flanged head 46 thereof rests in the countersunk recess 48 of said track support 22, thereby causing a vertical offset between horizontal passage 122 in vertical shaft 40 and horizontal recess 120 in table 20. When eccentric member 130 of rotatable cam 118 is positioned with its outermost cam portion 132 facing upwardly, there is space therebelow (because of the narrowed section of said eccentric member 130) to accommodate the aforesaid upward tendency of vertical shaft 40, without causing jaws 24 and 26 to be tightened against table 20. However, when eccentric member 130 of rotatable cam 118 is positioned as shown in FIG. 4, with its outermost cam portion 132 facing downwardly, there is no space therebelow to accommodate the upward tendency of vertical shaft 40; instead, vertical shaft 40 is pulled downwardly, thereby tightening jaws 24 and 26 against table 20.

Thus, a simple turn of knob 126 tightens jaws 24 and 26 in clamping position and, at the same time, clamps track support 22 against rotation about vertical shaft 40.

Having now described the construction of the preferred embodiment shown in FIGS. 1-5, and the various preferred methods of operating it, I now describe a second preferred embodiment which is shown in FIGS. 6-11.

This embodiment is a simplified inexpensive vise, which is particularly adapted for use in small vises such as jeweler's vises. The vise comprises generally a table 220, a track support 222 mounted substantially parallel to and spaced above said table 220, a pair of jaws 224 and 226 each slidably accommodated on said track support 222 and adapted for rapid sliding motion therealong to work-clamping position, members 228 and 230 depending from jaw 224 at each side of track support 222 and resting on table 220, similar members 232 and 234 depending from jaw 226 at each side of track support 222 and resting on table 220, a cylinder 236 pivotably mounted about pivot pin 237 on track support 222, and provided with a spring-loaded bumper pin 238 extending longitudinally therefrom and adapted for bearing against jaw 226, a stationary block 239 against which jaw 224 is adapted to bear, and a vertical shaft 240 extending through corresponding mating cylindrical bores 242 and 244, respectively, in track support 222 and table 220, and provided with a tapered head 246 adapted to rest in a corresponding tapered recess 248 in track support 222.

The aforesaid depending members 228 and 230 of jaws 24 may be provided with gripping flange members 250 and 252 extending below said track support 222 to facilitate sliding of jaw 224 along track support 222. Similarly, depending members 232 and 234 of jaw 226 may be provided with gripping flange members 254 and 256, serving a similar purpose. Jaws 224 and 226 are thus positively guided for ready sliding back and forth along track support 222. It will be noted, from FIGS. 7, 9, and 10, that jaws 224 and 226 rest slidingly on table 220, while track support 222 is spaced above table 220.

Jaws 224 and 226 are similar to each other, in that each is normally free to slide along track support 222, no locking pawl plunger or pawl teeth being used in this embodiment, as contrasted with the embodiment of FIGS. 1–5. Jaws 224 and 226 may each be provided, as shown in FIGS. 6, 7, and 10, with corresponding semi-circular concentric step grooves 257, 259, 261 and 263, 265, 267, respectively, for holding circular objects such as watches. Such an object is indicated in phantom in FIG. 7 by the numeral 316.

Stationary block 239 may be inserted into track support 222 by means of vertical pins 241 and 243, which are housed in bores 245 and 247, respectively, of stationary block 239, and bores 249 and 251, respectively, of track support 222. If desired, track support 222 may be provided with a plurality of pairs of bores similar to 249 and 251, at different positions (not shown), for mounting stationary block 239 at various alternative positions. Stationary block 239 may also be provided with a set screw 253 which is housed in a female threaded horizontal open passage 255, in which case the position of the end of said set screw 253 may be adjusted by turning said set screw 253, thereby providing bearing support for jaw 224 at various positions, as desired.

Referring now to FIGS. 6, 7, and 11, there is shown the aforesaid pivotable cylinder 236 mounted pivotably on track support 222 by means of pivot pin 237. Said cylinder 236 is provided with a horizontal bore 300 therein, open at one end, as shown, a spring-loaded horizontal bumper pin 238 being partially housed therein, its end extending outwardly therefrom. Cylinder 236 is also provided with a longitudinal groove 301 in the upper surface thereof, which communicates with said horizontal bore 300. Bumper pin 238 is also provided with a vertical guide pin 303 adjacent its inner end, which guide pin 303 rides in longitudinal groove 301, thus serving as a guide for bumper pin 238 and also as a limit for outward motion thereof. A coil spring 314 housed in horizontal bore 300 urges bumper pin 238 outwardly, being maintained under compression by the closed end of cylinder 236 and the inner end of bumper pin 238.

The vise may thus be clamped in work-clamping position, in the case of an object which fits within the step grooves 257, 263, or 259, 265, or 261, 267 of jaws 224 and 226, in the following manner. Starting with cylinder 236 turned away from the longitudinally aligned position shown in FIGS. 6 and 7, (1) jaw 224 is slid against stationary block 239, (2) the object 316 is placed in the appropriate groove of jaw 224 (e.g., groove 257), (3) jaw 226 is moved to the left into position for holding object 316 in its corresponding groove (e.g., 263), (4) cylinder 236 is then turned back into the longitudinally aligned position shown in FIGS. 6 and 7, bumper pin 238 moving inwardly during said turning sufficiently to allow said turning motion and reaching the final position shown, in which it bears against jaw 226 by virtue of the force exerted by coil spring 314. If many similar objects are to be worked upon in succession, jaw 226 need not be moved to a substantial extent, and the opening and closing of the vise is accomplished simply by turning cylinder 236 in one direction or the other. Thus, it will be seen that vise is exeremely simple and inexpensive, is very rugged, and yet is extremely rapid in operation.

If desired, such a vise need not even be provided with a table 220 or vertical shaft 240, in which case the vise consists simply of jaws 224 and 226, track support 222, stationary block 239, and cylinder 236 with its associated spring-loaded bumper pin.

On the other hand, if desired, the vise may be equipped with table 220 and vertical shaft 240, thereby permitting rotation of the aforesaid structure about said vertical shaft 240 and locking said vise into work-clamping position and against rotation by the activation of a rotatable cam member 318. The operation of said rotatable cam member 318 is identical with the operation of the similar rotatable cam member 118 shown in FIGS. 1, 2, and 4 and described above, the numerals being the same except that each has been increased by 200, the only differences being that the head 246 of vertical shaft 240 is now shown as tapered instead of flanged, the recess 248 of track support 222 being now tapered to match, and a set screw wrench socket 326 now being substituted for the knob 126. Therefore, it is not necessary to repeat here the discussion of the operation of vertical shaft 240 and rotatable cam member 318.

Other modifications in the details of construction may also be made without departing from the spirit of the invention, the principal novel features of which are set forth below.

I claim:

1. A sliding cam actuator for raising and lowering a plunger in a housing, comprising a plunger passage extending through said plunger, a passage in said housing registering with said plunger passage at both sides thereof, a bolt adapted to slide back and forth in said plunger and housing passages, and upwardly projecting and downwardly depending spaced apart cam portions of said bolt, said plunger passage being great enough in height to allow the sliding entry at any given time of one and only one of said upwardly projecting and downwardly depending cam portions.

2. A vise adapted for clamping a workpiece in working position, comprising a track support, a pair of jaws slidable along said track support, each of said jaws comprising a body portion adapted for sliding along the upper surface of said track support and a lower flange member lying below and parallel to said track support and rigidly affixed to said body portion, a table spaced below said track support by said flange members of said jaws and slidably supporting said flange members of said jaws, and means for pulling said track support toward said table thereby tightening said jaws against said table.

3. The vise set forth in claim 2, wherein said means for pulling said track support toward said table comprise a shaft having an enlarged upper head, a passage for said shaft extending vertically through said track support and having an enlarged upper portion to accommodate said enlarged head of said shaft, a vertical recess in said table for receiving the lower end of said shaft and registering with said passage in said track support, a transverse horizontal passage extending through said shaft, and transverse horizontal bores in said table registering with said horizontal passage through said shaft on both sides thereof, and a rotatable cam member housed in said transverse horizontal passage and bores and provided with an eccentric portion adapted to be received by said horizontal passage through said shaft and to move said shaft upwardly and downwardly as said rotatable cam member is rotated, thereby releasing and tightening said jaws to said table as desired.

4. A vise adapted for clamping a workpiece in working position, comprising a track support, a pair of jaws slidable along said track support, means cooperating with said track support for limiting outward motion of one of said jaws, a bumper pin, spring-loading means for applying spring pressure to said pin, a housing for said pin, a pivot pin affixed to said housing, and a recess in said track support adapted to pivotably receive said pivot pin thereby permitting pivoting of said housing about said pivot pin to align said bumper pin longitudinally with said track support and to pivot it out of such alignment as described, thereby permitting said bumper pin to bear against the outer face of said second jaw and to be moved out of bearing contact therewith as desired.

5. A vise adapted for clamping a workpiece in working position, comprising a track support, a pair of jaws slidable along said track support, means cooperating with said track support for limiting outward motion of one of said jaws, a bumper pin, spring-loading means for applying spring pressure to said pin, and mounting means cooperating with said track support for applying said bumper pin against the outer face of the second of said jaws thereby urging said jaws and workpiece together with the force of said spring pressure, said mounting means including screw means externally operable to override said spring-loading means and to bear directly against said bumper pin, thereby exerting an unyielding mechanical force between said jaws and workpiece.

References Cited in the file of this patent

UNITED STATES PATENTS

| | | |
|---|---|---|
| 865,302 | Hanson | Sept. 3, 1907 |
| 893,875 | Schneider | July 21, 1908 |
| 1,765,826 | Disibio | June 24, 1930 |
| 2,333,114 | Meyer | Nov. 2, 1943 |
| 2,539,085 | Kerseg | Jan. 23, 1951 |
| 2,764,380 | Gumphrey | Sept. 25, 1956 |
| 2,949,947 | Story | Aug. 23, 1960 |

FOREIGN PATENTS

| | | |
|---|---|---|
| 996,854 | France | Sept. 5, 1951 |